United States Patent [19]

Ohkubo

[11] Patent Number: 4,685,352
[45] Date of Patent: Aug. 11, 1987

[54] POWER DISTRIBUTING MECHANISM
[75] Inventor: Masahiro Ohkubo, Kadoma, Japan
[73] Assignee: Kabushiki Kaisha Daikin Seisakusho, Negagawa, Japan
[21] Appl. No.: 701,195
[22] Filed: Feb. 13, 1985
[30] Foreign Application Priority Data Feb. 14, 1984 [JP] Japan ................... 59-26767

[51] Int. Cl.$^4$ ............................................ F16H 37/06
[52] U.S. Cl. .................. 74/665 GA; 74/711; 180/248
[58] Field of Search ............. 74/710.5, 711, 650, 74/665 GA; 180/247, 248, 249, 250; 192/89 A, 49, 56 R, 101

[56] References Cited

U.S. PATENT DOCUMENTS

| 2,699,852 | 1/1955 | Costi | 180/250 X |
| 2,802,544 | 8/1957 | Pringle | 180/248 X |
| 2,887,201 | 5/1959 | Willis | 180/247 |
| 2,971,595 | 2/1961 | Fabere et al. | 180/247 |
| 3,058,558 | 10/1962 | Hawk | 180/247 X |
| 3,451,496 | 6/1969 | Myers | 180/249 X |
| 3,827,520 | 8/1974 | Mueller | 180/249 |
| 3,929,200 | 12/1975 | Behar | 180/249 X |
| 4,462,271 | 7/1984 | Stieg | 74/710.5 X |
| 4,553,623 | 11/1985 | Ohkubo | 180/247 |

FOREIGN PATENT DOCUMENTS

| 277818 | 5/1965 | Australia | 180/249 |
| 522746 | 3/1956 | Canada | 180/249 |

Primary Examiner—Leslie Braun
Assistant Examiner—Dwight G. Diehl
Attorney, Agent, or Firm—Bradford E. Kile

[57] ABSTRACT

The present disclosure describes a power distributing mechanism for a vehicle including rear wheels as driving wheels and front wheels as driving and steering wheels, comprising a drive shaft for the rear wheels; a shaft for the front wheels coaxially adjacent to the shaft for the rear wheels; a driving rotator having outer teeth and connected to the shaft for the rear wheels; a driven rotator having outer teeth and axially slidably connected to the shaft for the front wheels; a forcing mechanism for elastically forcing the driven rotator toward the driving rotator; a cylindrical intermediate member disposed around both rotators and having inner teeth engageable with the outer teeth of the respective rotators with circumferential spaces therebetween; and a braking mechanism for applying a braking force to the rotating intermediate member; said both rotators being provided at the end surface portions projections for disengaging the driven rotator.

6 Claims, 9 Drawing Figures

POWER DISTRIBUTING MECHANISM

BACKGROUND AND SUMMARY OF THE INVENTION

The present invention relates to a power distributing mechanism applicable in a vehicle of an all wheel drive type, of which front wheels are used as steering wheels, such as ordinary cars, off-road automobiles, industrial vehicles and construction vehicles.

Generally, a vehicle of an all wheel drive type is designed to transmit a power to front and rear wheels through a transmission and to control steering by front wheels. It has been well known that when such vehicle of the front-steering type is steered, rotation speed of the front wheel becomes larger than that of the rear wheels. This discrepancy in speed is a result of the rear wheels being closer to the central point of rotary motion as the vehicle turns. The front wheels during steered motion travel a larger distance on the outer circumference of vehicle rotary motion than do the rear wheels on a rotary path. The effect is that the rear wheels tend to shift direction in place while the front steering wheels roll to reach a new orientation.

Therefore, when the power is supplied directly to the front and rear wheels from the transmission, the difference of above rotation speed during the steering causes a slip of tires, which results in a power loss and wearing of tires, and may cause breakage of the driving system. In order to avoid them, some vehicles have employed differential mechanisms to appropriately distribute the torque to the front and rear wheels. However, in such vehicles, when a wheel slips on a rough land such as a snow-covered road, a sufficient torque can not be transmitted to other wheels without slipping, so that those vehicles may disadvantageously looser driving stability.

Further, in an usual driving on a public road, there is a large loss of the mechanical energy when the all wheels are driven, and thus, two wheel driving is desired. Therefore, it is necessary or desirable to provide a selector device for selecting the two wheel driving and the four wheel driving.

Accordingly, it is an object of the invention to provide a power distributing mechanism, wherein a power to the front wheels can be cut off only when the front wheels rotates faster than the rear wheels in the all wheel driving condition.

Other object of the invention is to provide a mechanism, wherein a structure is simple without a complicated mechanism such as a non-spin differential mechanism, and thus, the manufacturing cost can be reduced.

Another object of the invention is to provide a mechanism, where in a selecting or switching operation between a two-wheel driving and an all-wheel driving can be performed both in a running condition and a stopping condition of a vehicle.

According to the invention, a power distributing mechanism for a vehicle of a front and rear wheel driving type wherein a driving system is designed to transmit a power through a transmission to front and rear wheels and the front wheels are designed to be steered, comprises a shaft for the rear wheels adapted to connect to a driving mechanism; a shaft for the front wheels coaxially adjacent to the shaft for the front wheels; a driving rotator having outer teeth and connected to the outer periphery of the shaft for the rear wheels; a driven rotator having outer teeth and axially slidably connected to the outer periphery of the shaft for the front wheels; a forcing means for elastically forcing the driven rotator toward the driving rotator; a cylindrical intermediate member disposed around both rotators and having inner teeth engageable with the outer teeth of the respective rotators with circumferential spaces therebetween; and a braking means for applying a braking force to the rotating intermediate member; said both rotators being provided at the end surface portions facing to each other with projections which are adapted to generate axially opposite forces to move away and disengage the driven rotator from the intermediate member when a relative rotation is generated between both rotators.

Other and further objects, features and advantages of the invention will appear more fully from the following description of the preferred embodiments of the invention.

DETAILED DESCRIPTION OF THE PREFERRED EMBODIMENTS

Figure 1:
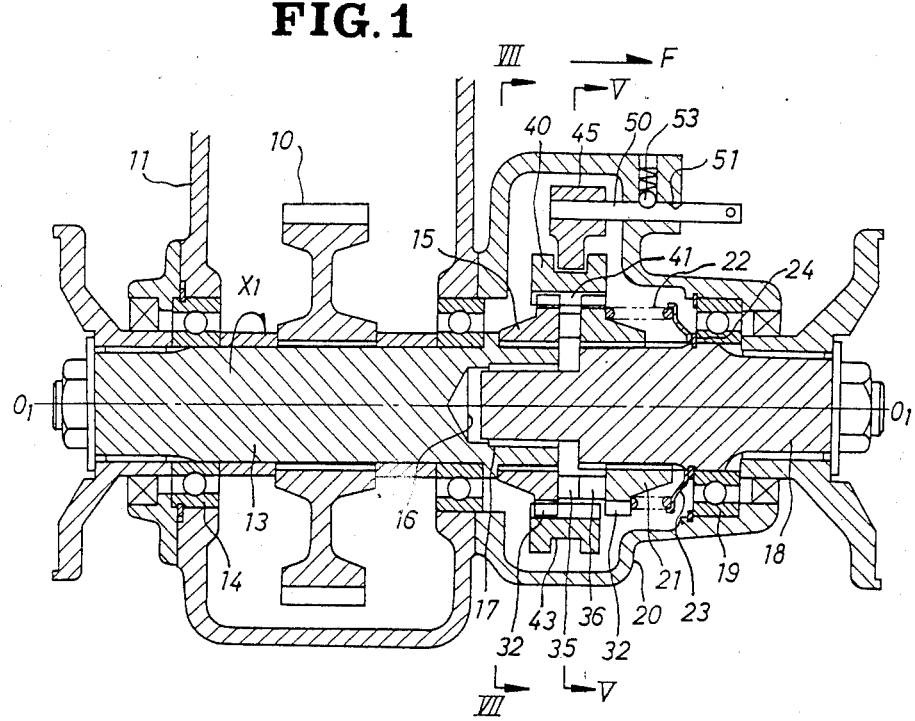
FIG. 1 is a longitudinally sectional view of a power distributing mechanism of an embodiment of the invention.

Referring to FIG. 1, a main reduction gear 10, which is adapted to be driven by an engine (not shown) through a power transmitting mechanism, is disposed in a housing 11 and is splined to a shaft 13 for rear wheels (not shown). The shaft 13 for the rear wheels is supported by the transmission housing 11 through ball bearings 14, and the center line 01—01 thereof extends in the longitudinal direction of the vehicle. The forward end of the shaft 13 projecting forwardly (in the direction of an arrow F) from the housing 11 is provided at the outer periphery with spline teeth to which a driving rotator 15 is splined, and is provided with an end hole 16 into which a shaft 18 for front wheels is coaxially supported through a needle bearing 17. A front portion of the shaft 18 for the front wheels is rotatably supported through a ball bearing 19 by a housing 20, of which rear end is fixed to the transmission housing 11. In the housing 20, a driven rotator 21 is slidably splined onto the shaft 18 for the front wheels and is faced coaxially to the driving rotator 15. The driven rotator 21 is forced from the front side toward the driving rotator 15 by a compressible coil spring 22, of which front end is supported by a spring seat 23 fixed by a snap ring 24 to the shaft 18.

Figure 2:
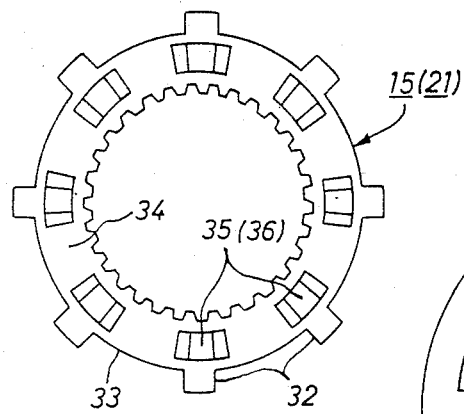
FIG. 2 is a front view of a rotator employed in an embodiment of FIG. 1.
Figure 4:
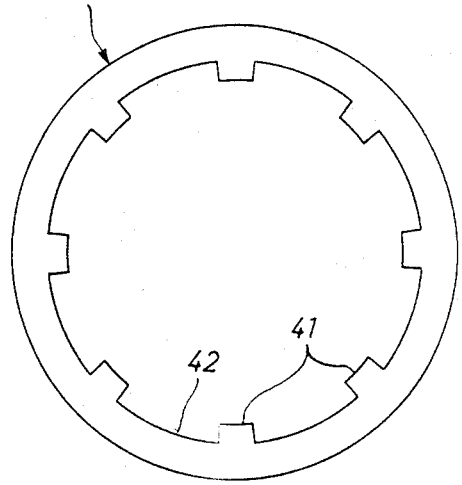
FIG. 4 is a front view of an intermediate member of FIG. 1.
Figure 3:
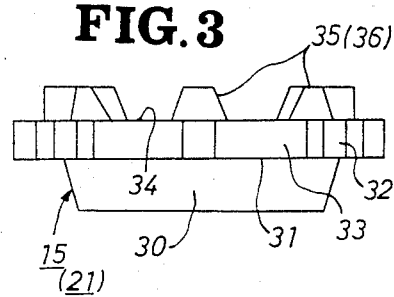
FIG. 3 is a side view of a rotator of FIG. 2.
Figure 5:
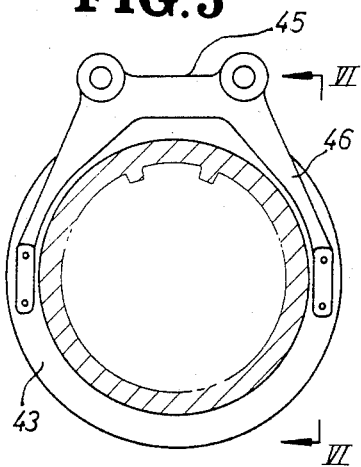
FIG. 5 is a sectional view taken along line V—V in FIG. 1.
Figure 6:
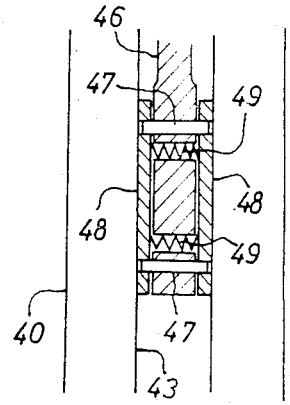
FIG. 6 is a side view taken along line VI—VI in FIG. 5 with a certain part cut away.

The driving and driven rotators 15 and 21 have substantially same structures, as illustrated in FIGS. 2 and 3. Each rotator has a boss 30 (FIG. 3) and a radial flange 31. The flange 31 is provided at the periphery with circumferentially equally spaced outer teeth 32 with circumferentially long hollows 33 therebetween. The rotators 15 and 21 are provided at the end surfaces facing to each other with circumferentially spaced projections 35 and 36 which are positioned on circles of a same radius. Side surfaces of each projection 35 (36) are inclined so that the circumferential width of each projection 35 (36) may be narrowest at the top ends. The circumferential spaces between the projections 35 and 36 are so determined that the projections 35 can enter the spaces between the projections 36 to circumferentially engage together, as shown in an upper half of FIG. 1. A substantially cylindrical intermediate member 40 is coaxially and slidably engaged at inner teeth 41 thereof with the outer teeth 32. As shown in FIG. 4, the inner teeth 41 is circumferentially and equally spaced to each other with circumferentially long hollows 42 therebetween. As shown in FIG. 1, the intermediate member 40 is provided at the outer periphery with an annular groove 43, into which a fork 46 of a yoke 45 is engaged, as shown in FIG. 5. As shown in FIG. 6, two friction facing or lining plates 48 are slidably supported by each end of the fork 46 by means of two pins 47 parallel to the center line 01—01 (FIG. 1). The facing plates 48 are forced and pressed by weak springs 49 to both inner side surfaces of the groove 43.

As shown in FIG. 1, the yoke 45 is fixed to a rear end of a push rod 50 which is parallel to the center line 01—01 and is slidably supported by the housing 20. The front end of the push rod 50 is projected forwardly from the housing 20 and is connected to an air cylinder or others for selecting the operations. The push rod 50 has recesses 51 for positioning into which a ball 53 engages. The ball 53 is elastically forced and movably fitted in the wall of the housing 20.

Figure 7:
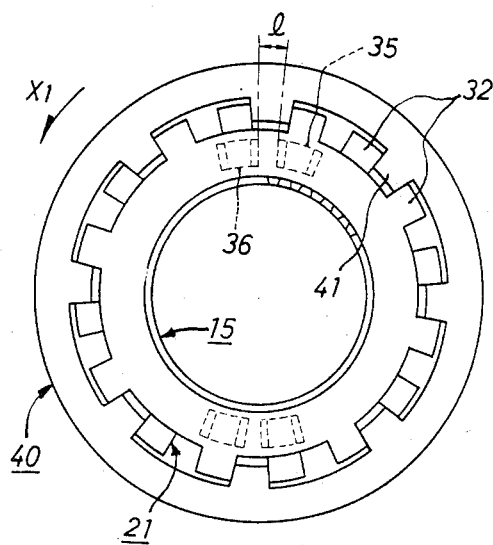
FIG. 7 is a fragmentary sectional view taken along line VII—VII in FIG. 1.

FIG. 7 illustrates a condition in which the rotators 15 and 21 engage with the intermediate member 40. In this condition, each inner tooth 41 is pinched from both sides by the outer teeth 32 of the rotators 15 and 21, and a circumferentially short space l is formed between the projections 35 and 36 of the rotators 15 and 21.

An operation is as follows. The upper half of FIG. 1 illustrates said engaged condition and the lower half thereof illustrates a condition in which the driven rotator 21 is disengaged from the inner teeth 41 of the intermediate member 40.

The shaft 13 for the rear wheels are always driven in a direction, e.g., shown by an arrow X1 by a power transmitted through the main reduction gear 10. In the engaged condition shown in the upper half of FIG. 1, the outer teeth 32 of the driven rotator 21 are engaged with the inner teeth 41 of the intermediate member 40, so that the power is transmitted from the shaft 13 through the driving rotator 15, the intermediate member 40 and the driven rotator 21 to the shaft 18 for the front wheels.

When the front wheels are steered, the shaft 18 for the front wheels rotates faster than the shaft 13 for the rear wheels, so that the projections 36 of the driven rotator 21 are circumferentially pressed to the projections 35 and receive an axial force therefrom. Thus, as shown in the lower half of FIG. 1, the driven rotator 21 slides in the direction of the arrow F and disengages from the intermediate member 40, so that the power is not transmitted from the driving rotator 15 to the driven rotator 21. In this disengaged condition, since the intermediate member 40 always receives a braking force against the rotation from the yoke 45, the inner teeth 41 of the intermediate member 40 are maintained in the condition engaged with the outer teeth 32 of the driven rotator 21 forced by the spring 22, so that vibration and attacking noises are not generated therebetween. When the shaft 18 for the front wheels synchronizes with the shaft 13 for the rear wheels, the driven rotator 21 reengages with the intermediate member 40, so that the power is transmitted from the driving rotator 15 through the intermediate member 40 to the driven rotator 21.

When the transmission is shifted from the forward driving position to the rearward driving position, the driving rotator 15 rotates reversely, so that the teeth 32 move away from the teeth 41 of the braked intermediate member 40 and the projections 35 press the projections 36 to axially move and disengage the rotator 21 from the intermediate member 40. After the teeth 32 of the rotator 15 move the spaces between the inner teeth 41 of the intermediate member 40, the teeth 32 of the rotator 15 reengage with the inner teeth 41. At the substantially same time, the driven rotator 21 is moved by the spring 22 and engages with the intermediate member 40. Therefore, both shafts 13 and 18 are driven. When the vehicle is steered during the rearward driving, the members and parts operate similarly as the forward driving, although the contact surfaces of the teeth 32 of the rotators 15 and 21 and teeth 41 of the member 40 change. Further, when the rearward driving direction is switched to the forward driving direction, they automatically operates similarly as said shifting or switching operation from the forward to the rearward.

Figure 8:
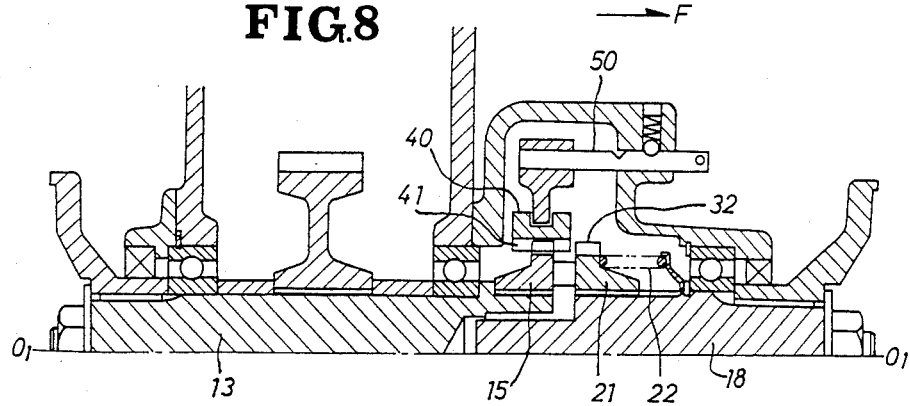
FIG. 8 is a fragmentary sectional view of an embodiment of FIG. 1 in a two-wheel driving condition.

In order to switch the all wheel driving condition to the two wheel driving condition, the push rod 50 is shifted in the direction opposite to the arrow F to move the intermediate member 40 to the position shown in FIG. 8. Whereby, the intermediate member 40 disengages from the driven rotator 21, and thus, the power is not transmitted to the shaft 18 for the front wheels. In order to switch this condition to the all wheel driving condition, the push rod 50 is shifted ini the direction of the arrow F to the position in FIG. 1. Initially in this operation, the inner teeth 41 of the intermediate member 40 may not contact and engage with the teeth 32 of the rotator 21. However, the intermediate member 40 rotates relatively to the rotator 21 and engages with it immediately after above contact, because a difference of the rotation speed between the front and the rear wheels is caused by differences of the air pressures of the tires or the load between the front and rrear wheels, the steering, the conditioin of the road surface or others.

Even when the vehicle is stopped, the driving condition can be switched from the two wheel driving to the all wheel driving by shifting the push rod 50, because the intermediate member 40 rotates relatively to the rotator 21 immediately after the start of the vehicle and the spring 22 which has been compressed moves the rotator 21 to engage it with the member 40. Of course, the driving condition can be switched from the all wheel driving to the two wheel driving by shifting the push rod 50.

Chamfering may be applied to the end surfaces of the inner teeth 41 and/or outer teeth 32 of the rotator 21 to facilitate the engaging operation thereof.

According to the invention, as stated hereinbefore, following advantages can be obtained:

(a) In the all wheel driving condition, the power to the front wheels can be cut off only when the front wheels rotate faster than the rear wheels, which prevents the slip of the tires and improves the driving stability.

(b) A complicated mechanism such as the conventional non-spin differential is not required, and the structure can be simple, resulting in a low manufacturing cost.

(c) The switching between the two wheel driving and the all wheel driving can be performed independently of the driving and the stopping condition of the vehicle.

Figure 9:
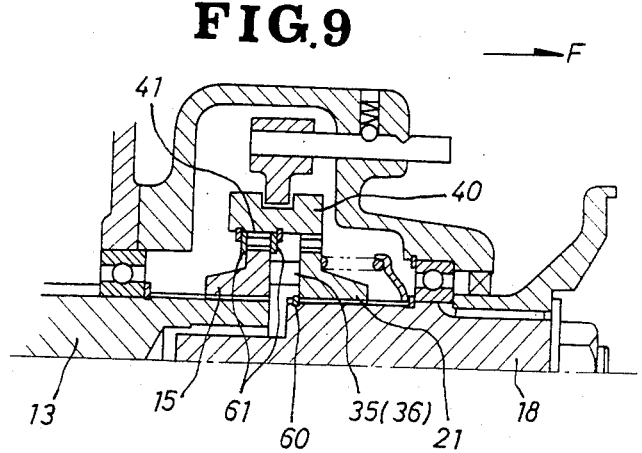
FIG. 9 is a fragmentary longitudinally sectional view of another embodiment of the invention.

The present invention may be modified as illustrated in FIG. 9 to prevent the attacking noise between the projections 35 and 36 in the two wheel driving condition. In FIG. 9, a stopper 60 consisting of a snap ring is provided on the shaft 18 so as to restrict the movement of the driven rotator 21 in the direction opposite to the arrow F. Further, stoppers 61 for the driving member 15 are provided on the inner teeth 41 of the intermediate member 40 so that the member 15 may slide together with the intermediate member 40. In this structure, when the intermediate member 40 is shifted away from the rotator 21 for the two wheel driving, the driving rotator 15 axially slides on the shaft 13 and the the projections 35 axially disengage from the projections 36, so that the projections 35 and 36 do not generate the attacking noise.

The power distributing mechanism of the invention may be installed either in the output side of the transmission or the input side of the drive axle, and further in a sub-transmission between the main transmission and the driving axle, if available.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed:

What is claimed is:

1. A power distributing mechanism for a vehicle of a front and rear wheel driving type wherein a driving system is designed to transmit power through a transmission to front and rear wheels wherein the front wheels are designed to be steered, comprising:

a shaft for the rear wheels adapted to connect to a driving mechanism;

a shaft for the front wheels coaxially adjacent to the shaft for the rear wheels;

a driving rotator having outer teeth and connected to the outer periphery of the shaft for the rear wheels;

a driven rotator having outer teeth and connected to the shaft for the front wheels;

a forcing means for elastically forcing the driven rotator toward the driving rotator;

a cylindrical intermediate member disposed around both rotators and having inner teeth engageable with the outer teeth of the respective rotators with circumferential spaces therebetween, said circumferential spaces enable a predeterminable scope of rotation between said front and rear rotators;

braking means for applying a braking force to the intermediate member;

said rotators both being provided at the end surface portions facing each other with correspondingly tapered projections for mutual engagement, the tapering on said correspondingly tapered projections in mutual engagement being operative to induce a parting force on each other responsive to a differing rotary speed of said driving and driven rotators; and means responsive to said parting force for causing said driven rotator to move axially away from said driving rotator and said intermediate member, while keeping said engagement between said intermediate member and said driving rotator unchanged, whereby said driven rotator is automatically caused to become disengaged from said driving rotator through said intermediate member when said driving rotator and said driven rotator are rotating at differing speed.

2. A power distributing mechanism of claim 1 wherein a circumferential space between both projections in an ordinary front and rear wheel driving condition is determined shorter than the circumferential spaces between the outer teeth of the driven rotator and the inner teeth of the intermediate member, and the side surfaces of both projections which face circumferentially to each other are inclined so that the force for moving the driven rotator away from the driving rotator may be generated when the side surfaces are pressed to each other.

3. A power distributing mechanism of claim 1 wherein said braking means is provided with a yoke which is supported by a housing by means of a support member and is fitted into a groove formed at the outer periphery of the intermediate member, and the yoke is provided with a contact portion which always contacts the inner surface of the groove.

4. A power distributing mechanism of claim 3 wherein said contact portion is formed by a friction facing which contacts with the inner side surfaces of the groove, and the yoke is provided with a spring for urging the facing against the inner side surface of the groove.

5. A power distributing mechanism of claim 3 wherein said support member is adapted to be connected to an operating means so that a operating member may shift the intermediate member through the support member and the yoke between a position in which the intermediate member engages with both driving and driven rotators and the position in which the intermediate member disengages from the driven member.

6. A power distributing mechanism as recited in claim 1 wherein said engagement between said driving rotator and said intermediate member remain unaffected by said disengagement of said driven rotator from said driving rotator.

* * * * *